United States Patent
Suzuki et al.

(10) Patent No.: US 11,248,102 B2
(45) Date of Patent: Feb. 15, 2022

(54) ROLL, METHOD FOR MANUFACTURING ROLL, AND RESIN

(71) Applicant: INOAC TECHNICAL CENTER CO., LTD., Aichi (JP)

(72) Inventors: Takayuki Suzuki, Kanagawa (JP); Minoru Ubukata, Kanagawa (JP); Takuya Ito, Aichi (JP)

(73) Assignee: INOAC TECHNICAL CENTER CO.. LTD., Nagoya (JP)

( * ) Notice: Subject to any disclaimer, the term of this patent is extended or adjusted under 35 U.S.C. 154(b) by 116 days.

(21) Appl. No.: 16/467,822

(22) PCT Filed: Dec. 9, 2016

(86) PCT No.: PCT/JP2016/086783
§ 371 (c)(1),
(2) Date: Jun. 7, 2019

(87) PCT Pub. No.: WO2018/105116
PCT Pub. Date: Jun. 14, 2018

(65) Prior Publication Data
US 2019/0332051 A1    Oct. 31, 2019

(51) Int. Cl.
*C08J 9/36*    (2006.01)
*C08G 18/12*    (2006.01)
(Continued)

(52) U.S. Cl.
CPC .............. *C08J 9/365* (2013.01); *C08G 18/12* (2013.01); *C08G 18/3876* (2013.01);
(Continued)

(58) Field of Classification Search
CPC .... C08J 9/365; C08J 2375/04; C08J 2475/14; Y10T 428/249955; Y10T 428/249991
See application file for complete search history.

(56) References Cited

U.S. PATENT DOCUMENTS 7,284,649 B2    10/2007    Shiraki et al.
8,337,373 B2    12/2012    Sakata
(Continued)

FOREIGN PATENT DOCUMENTS

CN    101061141 A    10/2007
CN    104379621 A    2/2015
(Continued)

OTHER PUBLICATIONS

Communication dated Jul. 8, 2020 issued by the European Intellectual Property Office in counterpart European Application No. 16923483.8.
(Continued)

*Primary Examiner* — Hai Vo
(74) *Attorney, Agent, or Firm* — Sughrue Mion, PLLC

(57) ABSTRACT

A roll excellent in abrasion resistance, which contains: a resin layer containing a first atom group having a plurality of sulfur atoms, a plurality of second atom groups having a carbon chain that has a plurality of carbon atoms arranged in a line and has an end bonded to any one of the plurality of sulfur atoms, and a plurality of third atom groups each of which has a urethane bond and is bonded to any one of the plurality of second atom groups; and a cylindrical foamed resin having an outer surface covered with the resin layer.

10 Claims, 15 Drawing Sheets

(51) Int. Cl.
  *C08G 18/38* (2006.01)
  *C08G 18/48* (2006.01)
  *C08G 18/67* (2006.01)
  *C09D 175/14* (2006.01)
  *G03G 15/00* (2006.01)

(52) U.S. Cl.
  CPC ....... *C08G 18/4829* (2013.01); *C08G 18/672* (2013.01); *C08G 18/675* (2013.01); *C08G 18/6715* (2013.01); *C09D 175/14* (2013.01); *C08J 2205/05* (2013.01); *C08J 2375/04* (2013.01); *C08J 2475/14* (2013.01); *G03G 15/6558* (2013.01); *Y10T 428/249955* (2015.04); *Y10T 428/249991* (2015.04)

(56) References Cited

U.S. PATENT DOCUMENTS

| | | | |
|---|---|---|---|
| 2003/0118372 A1* | 6/2003 | Kitano | G03G 15/0291 399/176 |
| 2006/0128826 A1 | 6/2006 | Ellison et al. | |
| 2007/0111874 A1 | 5/2007 | Sugimura et al. | |
| 2008/0013985 A1* | 1/2008 | Yamakawa | G03G 15/0818 399/119 |
| 2011/0124478 A1* | 5/2011 | Tagawa | G03G 15/1685 492/56 |
| 2011/0281967 A1 | 11/2011 | Krawiec | |
| 2012/0165498 A1 | 6/2012 | Kitano et al. | |
| 2012/0225969 A1 | 9/2012 | Miyabayashi et al. | |
| 2014/0079442 A1 | 3/2014 | Yamada et al. | |

FOREIGN PATENT DOCUMENTS

| | | |
|---|---|---|
| CN | 104395838 A | 3/2015 |
| JP | 6-7949 B2 | 2/1994 |
| JP | 8-169573 A | 7/1996 |
| JP | 10-159834 A | 6/1998 |
| JP | 2002-48129 A | 2/2002 |
| JP | 2002-310136 A | 10/2002 |
| JP | 2004-268487 A | 9/2004 |
| JP | 2006-160468 A | 6/2006 |
| JP | 2007-133223 A | 5/2007 |
| JP | 2008-37524 A | 2/2008 |
| JP | 4393499 B2 | 1/2010 |
| JP | 2012-149224 A | 8/2012 |
| JP | 2013-181094 A | 9/2013 |
| JP | 2015-172176 A | 10/2015 |
| WO | 2013191254 A1 | 12/2013 |

OTHER PUBLICATIONS

Zhenglong Yang et al., "Newly UV-curable polyurethane coatings prepared by multifunctional thiol- and ene-terminated polyurethane aqueous dispersions mixtures: Preparation and characterization", Polymer, vol. 50, No. 7, Elsevier Science Publishers B.V, GB, DOI: 10.1016/J.POLYMER.2008.12.018, ISSN: 0032-3861, Mar. 20, 2009, pp. 1717-1722, 6 pages total, XP025976818.
Written Opinion (PCT/ISA/237) issued by the International Searching Authority in corresponding International Application No. PCT/JP2017/086783, dated Feb. 7, 2017.
International Search Report (PCT/ISA/210), issued by International Searching Authority in corresponding International Application No. PCT/JP2017/086783, dated Feb. 7, 2017.
Communication dated Nov. 13, 2018 in counterpart Japanese Patent Application 2015-120122.

* cited by examiner

Table 1

| Raw material | | Example 1 | Example 2 | Example 3 | Example 4 | Example 5 | Example 6 | Example 7 | Example 8 | Example 9 | Example 10 |
|---|---|---|---|---|---|---|---|---|---|---|---|
| | Prepolymer (part by weight) | PP1 (100) | PP1 (100) | PP1 (100) | PP1 (100) | PP1 (100) | PP2 (100) | PP2 (100) | PP2 (100) | PP2 (100) | PP2 (100) |
| | Polyfunctional thiol (part by weight) | PEMP[1] (5) | PEMP (5) | PEMP (5) | PEMP (5) | PEMP (5) | PEMP (5) | PEMP (5) | PEMP (5) | PEMP (5) | PEMP (5) |
| | Initiator (part by weight) | Irg.[2] (1) | Irg.1 (1) | Irg.1 (1) | Irg.1 (1) | Irg.1 (1) | Irg.1 (1) | Irg.1 (1) | Irg.1 (1) | Irg.1 (1) | Irg.1 (1) |
| Hardness | | 30 | 30 | 30 | 30 | 30 | 50 | 50 | 50 | 50 | 50 |
| Application thickness (mm) | | 0.3 | 0.45 | 0.6 | 0.75 | 0.9 | 0.3 | 0.45 | 0.6 | 0.75 | 0.9 |
| Static friction coefficient | | 2.42 | 2.39 | 2.36 | 2.35 | 2.27 | 2.20 | 2.20 | 2.12 | 1.96 | 2.01 |
| Compressive load (kg/36 mm) | | 0.30 | 0.31 | 0.32 | 0.33 | 0.34 | 0.31 | 0.32 | 0.33 | 0.36 | 0.37 |
| Abrasion amount (mg) | | 2.1 | 2.1 | 2.1 | 2.1 | 2.1 | 3.6 | 3.6 | 3.6 | 3.6 | 3.6 |
| Determination result | | △ | ○ | ○ | ○ | ○ | ○ | ○ | ○ | △ | △ |

1) PEMP is an abbreviation of pentaerythritol tetrakis(3-mercaptopropionate) (a tetrafunctional thiol).

2) Irg. represents Irgacure 1173. Irgacure 1173 is a trade name of a photopolymerization initiator manufactured by BASF.

Table 2

| Raw material | | Example 11 | Example 12 | Example 13 | Example 14 | Example 15 | Example 16 | Example 17 | Example 18 | Example 19 | Example 20 | Example 21 |
|---|---|---|---|---|---|---|---|---|---|---|---|---|
| | Prepolymer (part by weight) | PP3 (100) | PP3 (100) | PP3 (100) | PP3 (100) | PP3 (100) | PP4 (100) | PP4 (100) | PP5 (100) | PP6 (100) | PP7 (100) | PP8 (100) |
| | Polyfunctional thiol (part by weight) | PEMP[1] (5) | PEMP (5) | PEMP (5) | PEMP (5) | PEMP (5) | PEMP (5) | PEMP (5) | PEMP (5) | PEMP (10) | PEMP (5) | PEMP (10) |
| | Initiator (part by weight) | Irg.[2] (1) | Irg.1 (1) | Irg.1 (1) | Irg.1 (1) | Irg.1 (1) | Irg.1 (1) | Irg.1 (1) | Irg.1 (1) | Irg.1 (1) | Irg.1 (1) | Irg.1 (1) |
| Hardness | | 70 | 70 | 70 | 70 | 70 | 15 | 15 | 90 | 30 | 30 | 30 |
| Application thickness (mm) | | 0.3 | 0.45 | 0.6 | 0.75 | 0.9 | 0.3 | 0.6 | 0.3 | 0.6 | 0.6 | 0.6 |
| Static friction coefficient | | 1.76 | 1.74 | 1.76 | 1.78 | 1.79 | 2.32 | 2.34 | 0.76 | 2.20 | 2.19 | 2.21 |
| Compressive load (kg/36 mm) | | 0.40 | 0.43 | 0.46 | 0.51 | 0.57 | 0.27 | 0.29 | 0.55 | 0.32 | 0.32 | 0.32 |
| Abrasion amount (mg) | | 4.8 | 4.8 | 4.8 | 4.8 | 4.8 | 5.2 | 5.2 | 4.2 | 25.3 | 4.4 | 19.3 |
| Determination result | | × | × | × | × | × | × | × | × | ○ | ○ | ○ |

1) PEMP is an abbreviation of pentaerythritol tetrakis(3-mercaptopropionate) (a tetrafunctional thiol).

2) Irg. represents Irgacure 1173. Irgacure 1173 is a trade name of a photopolymerization initiator manufactured by BASF.

FIG. 12

Table 3

| | Monomer having unsaturated bond and hydroxyl group (part by weight) | Isocyanate (part by weight) | Polyol (part by weight) | Molecular weight of polyol | First target value of NCO%[8] | Second target value of NCO%[9] |
|---|---|---|---|---|---|---|
| PP1 | 2-hydroxyethyl methacrylate (2.6) | HMDI[1] (5.5) | Preminol S4011[2] (100) | 10000 | 0.7 to 0.9 | 0.1 or less |
| PP2 | 2-hydroxyethyl methacrylate (6.5) | HMDI (13.8) | Actcol D4000[3] (100) | 4000 | 1.7 to 1.9 | 0.1 or less |
| PP3 | 2-hydroxyethyl methacrylate (13) | HMDI (27.6) | Actcol D2000[4] (100) | 2000 | 3.2 to 3.6 | 0.1 or less |
| PP4 | 2-hydroxyethyl methacrylate (1.4) | HMDI (3.1) | Preminol S4018[5] (100) | 18000 | 0.3 to 0.5 | 0.1 or less |
| PP5 | 2-hydroxyethyl methacrylate (26.0) | HMDI (55.1) | Actcol D1000[6] (100) | 1000 | 5.6 to 6.2 | 0.1 or less |
| PP6 | Propargyl alcohol (2.8) | HMDI (13.8) | Actcol D4000 (100) | 4000 | 1.7 to 1.9 | 0.1 or less |
| PP7 | HBVE[7] (5.8) | HMDI (13.8) | Actcol D4000 (100) | 4000 | 1.7 to 1.9 | 0.1 or less |
| PP8 | Allyl alcohol (2.9) | HMDI (13.8) | Actcol D4000 (100) | 4000 | 1.7 to 1.9 | 0.1 or less |
| PP9 | 2-hydroxyethyl acrylate (5.8) | HMDI (13.8) | Actcol D4000 (100) | 4000 | 1.7 to 1.9 | 0.1 or less |

1) HMDI is an abbreviation of dicyclohexylmethane diisocyanate.

2), 5) Preminol S4011 and Preminol S4018 are a trade name of polyether polyol manufactured by AGC Inc.

3), 4), 6) Actcol D4000, Actcol D2000, and Actcol D1000 are trade names of polyether polyol manufactured by Mitsui Chemicals.

7) HBVE is an abbreviation of tetramethylene glycol monovinyl ether.

8) target value of content ratio of isocyanate group in first reaction product generated by reacting isocyanate with polyol 9) target value of content ratio of isocyanate group in second reaction product generated by reacting "monomer having unsaturated bond and hydroxyl group" with first reaction product

FIG. 14

Table 4

| Raw material | | Comparative Example 1 | Comparative Example 2 | Comparative Example 3 | Comparative Example 4 | Comparative Example 5 | Comparative Example 6 | Comparative Example 7 | Comparative Example 8 | Comparative Example 9 | Comparative Example 10 |
|---|---|---|---|---|---|---|---|---|---|---|---|
| | Prepolymer (part by weight) | PP1 (100) | PP1 (100) | PP1 (100) | PP1 (100) | PP1 (100) | PP2 (100) | PP2 (100) | PP2 (100) | PP2 (100) | PP2 (100) |
| | Initiator (part by weight) | Irg.[1] (1) | Irg.1 (1) | Irg.1 (1) | Irg.1 (1) | Irg.1 (1) | Irg.1 (1) | Irg.1 (1) | Irg.1 (1) | Irg.1 (1) | Irg.1 (1) |
| Hardness | | 30 | 30 | 30 | 30 | 30 | 50 | 50 | 50 | 50 | 50 |
| Application thickness (mm) | | 0.3 | 0.45 | 0.6 | 0.75 | 0.9 | 0.3 | 0.45 | 0.6 | 0.75 | 0.9 |
| Static friction coefficient | | 1.86 | 2.05 | 2.01 | 1.91 | 2.05 | 1.63 | 1.76 | 1.71 | 1.82 | 1.81 |
| Compressive load (kg/36 mm) | | 0.30 | 0.30 | 0.32 | 0.34 | 0.36 | 0.32 | 0.34 | 0.35 | 0.40 | 0.40 |
| Abrasion amount (mg) | | 5.9 | 5.9 | 5.9 | 5.9 | 5.9 | 13.1 | 13.1 | 13.1 | 13.1 | 13.1 |
| Determination result | | × | △ | ○ | ○ | △ | ○ | ○ | ○ | × | × |

1) Irg. represents Irgacure 1173. Irgacure 1173 is a trade name of a photopolymerization initiator manufactured by BASF.

Table 5

| Raw material | | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 | Comparative Example 20 |
|---|---|---|---|---|---|---|---|---|---|---|---|
| | Prepolymer (part by weight) | PP3 (100) | PP3 (100) | PP3 (100) | PP3 (100) | PP3 (100) | PP4 (100) | PP4 (100) | PP5 (100) | Si[2] | Si |
| | Initiator (part by weight) | Irg.[1] (1) | Irg.1 (1) | Irg.1 (1) | Irg.1 (1) | Irg.1 (1) | Irg.1 (1) | Irg.1 (1) | Irg.1 (1) | - | - |
| Hardness | | 70 | 70 | 70 | 70 | 70 | 15 | 15 | 90 | 15 | 30 |
| Application thickness (mm) | | 0.3 | 0.45 | 0.6 | 0.75 | 0.9 | 0.3 | 0.6 | 0.3 | 0.6 | 0.6 |
| Static friction coefficient | | 1.24 | 1.11 | 1.26 | 1.36 | 1.34 | 1.81 | 2.03 | 0.64 | 2.17 | 0.75 |
| Compressive load (kg/36 mm) | | 0.42 | 0.45 | 0.49 | 0.55 | 0.61 | 0.29 | 0.29 | 0.58 | 0.33 | 0.34 |
| Abrasion amount (mg) | | 24.0 | 24.0 | 24.0 | 24.0 | 24.0 | 19.3 | 19.3 | 25.8 | 26.0 | - |
| Determination result | | × | × | × | × | × | × | × | × | ○ | × |

1) Irg. represents Irgacure 1173. Irgacure 1173 is a trade name of a photopolymerization initiator manufactured by BASF.
2) Si represents silicone.

FIG. 17

Table 6

| | | Example 22 | Example 23 | Example 24 |
|---|---|---|---|---|
| Raw material | Prepolymer (part by weight) | PP9 (100) | PP9 (100) | PP9 (100) |
| | Polyfunctional thiol (part by weight) | PEMP (5) | PEMP (5) | PEMP (5) |
| | Initiator (part by weight) | Irg (1) | Irg (1) | Irg (1) |
| Hardness | | 50 | 50 | 50 |
| Application thickness (mm) | | 0.3 | 0.6 | 0.9 |
| Static friction coefficient | | 2.03 | 2.22 | 2.36 |
| Compressive load (kg/36 mm) | | 0.33 | 0.34 | 0.37 |
| Abrasion amount (mg) | | 3.4 | 3.4 | 3.4 |
| Determination result | | ○ | ○ | Δ |

Table 7

| | | Comparative Example 22 | Comparative Example 23 | Comparative Example 24 |
|---|---|---|---|---|
| Raw material | Prepolymer (part by weight) | PP9 (100) | PP9 (100) | PP9 (100) |
| | Initiator (part by weight) | Irg (1) | Irg (1) | Irg (1) |
| Hardness | | 50 | 50 | 50 |
| Application thickness (mm) | | 0.3 | 0.6 | 0.9 |
| Static friction coefficient | | 1.61 | 1.72 | 1.79 |
| Compressive load (kg/36 mm) | | 0.35 | 0.37 | 0.41 |
| Abrasion amount (mg) | | 14.3 | 14.3 | 14.3 |
| Determination result | | ○ | Δ | × |

ROLL, METHOD FOR MANUFACTURING ROLL, AND RESIN

TECHNICAL FIELD

The present invention relates to a roll, a method for manufacturing the roll, and a resin.

BACKGROUND ART

A paper feed roll for conveying paper is provided in an image forming apparatus such as a copying machine, a printer, a facsimile machine, and a composite machine. Examples of the paper feed roll include a pickup roll, a feed roll, a separation roll, a conveying roll, or the like.

A high friction coefficient is required for the paper feed roll. The friction coefficient becomes lager as the contact area when the paper feed roll comes into contact with the paper is greater. Thus, a two-layered paper feed roll including an inner layer which is soft and easily deformable and an outer layer which has a large friction coefficient has been proposed (see, for example, Patent Documents 1 to 3).

Various materials have been proposed as the material of the outer layer of the paper feed roll, and silicone rubber is widely used from the viewpoint of contamination to the image forming apparatus and the likes (for example, Patent Document 3). A resin obtained by curing a urethane-based (meth)acrylate oligomer with ultraviolet irradiation has also been proposed as the material of the outer layer of the paper feed roll (for example, Patent Documents 4 and 5).

BACKGROUND ART DOCUMENTS

Patent Documents

Patent Document 1: JP-A-2006-160468
Patent Document 2: JP-A-H8-169573
Patent Document 3: JP-B-H6-7949
Patent Document 4: JP-A-2002-310136
Patent Document 5: Japanese Patent No. 4393499 specification

SUMMARY OF INVENTION

Problems that the Invention is to Solve

However, a paper feed roll having an outer layer of silicone rubber has a problem of low abrasion resistance. When the paper feed roll continues to be used, the outer layer with low abrasion resistance gradually is abraded. Then, the cross section of the paper feed roll deforms, and it is difficult to convey the paper. Thus, it is an object of the present invention to solve such a problem.

Means for Solving the Problems

In order to solve the above problem, according to one aspect of the present invention, a roll is provided, which contains: a resin layer containing a first atom group having a plurality of sulfur atoms, a plurality of second atom groups having a carbon chain that has a plurality of carbon atoms arranged in a line and has an end bonded to any one of the plurality of sulfur atoms, and a plurality of third atom groups each of which has a urethane bond and is bonded to any one of the plurality of second atom groups; and a cylindrical foamed resin having an outer surface covered with the resin layer.

Advantage of the Invention

According to the disclosed roll, a roll excellent in abrasion resistance is provided.

BRIEF DESCRIPTION OF DRAWINGS

FIG. 11 shows Tables 1 and 2 summarizing Examples 1 to 21.

FIG. 12 shows Table 3 for explaining raw materials of prepolymers used in Examples 1 to 21.

FIG. 14 shows Tables 4 and 5 summarizing Comparative Examples.

FIG. 17 shows Table 6 summarizing Examples 22 to 24 and Table 7 summarizing Comparative Examples 22 to 24.

DESCRIPTION OF EMBODIMENTS

Figure 1:
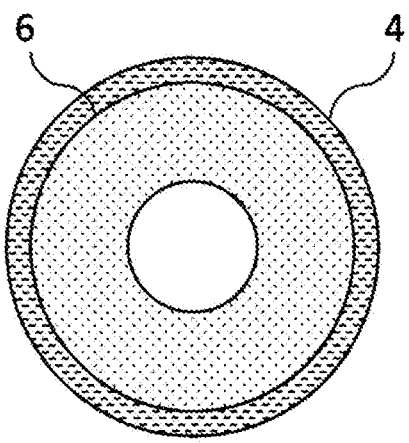
FIG. 1 is a diagram for explaining a cross section of a paper feed roll according to a first embodiment.

Hereinafter, embodiments of the present invention will be described with reference to the drawings. However, the technical scope of the present invention is not limited to these embodiments, but extends to matters described in the claims and equivalents thereof. Elements having the same structure or the like are denoted by the same reference numerals even though the drawings are different, and description thereof is omitted.

First Embodiment (1) Structure

FIG. 1 is a diagram for explaining a cross section of a paper feed roll 2 according to a first embodiment. As shown in FIG. 1, the paper feed roll 2 includes a resin layer 4, and a cylindrical foamed resin 6 having an outer surface covered with the resin layer 4.

—Resin Layer—

Figure 2:
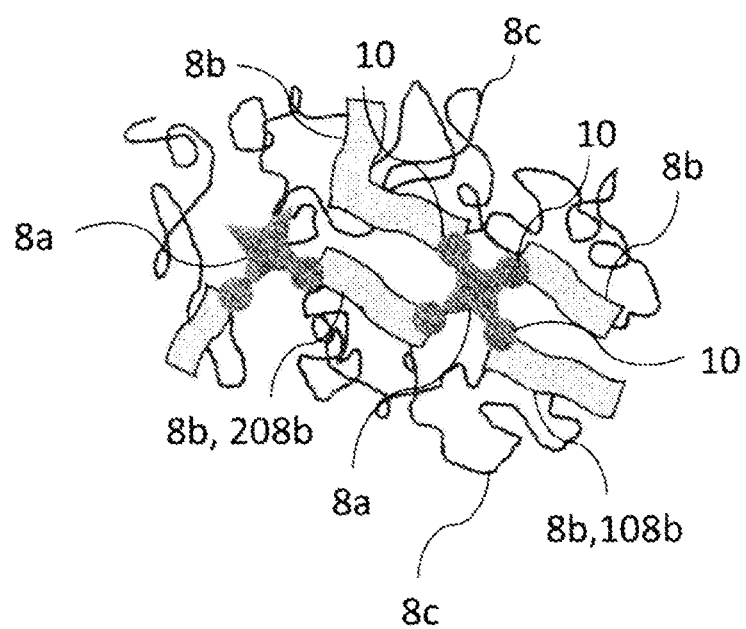
FIG. 2 is a diagram for explaining a molecular structure of the resin layer.

FIG. 2 is a diagram for explaining a molecular structure of the resin layer 4.

The resin layer 4 contains a first atom group 8a, a plurality of second atom groups 8b, and a plurality of third atom groups 8c.

The first atom group 8a is an atom group (a group of atoms) having a plurality of sulfur atoms 10. The first atom group 8a is, for example, an atom group obtained by removing hydrogen of a thiol group (—SH) from a tetra-functional thiol.

The second atom group 8b is an atom group having a carbon chain having a plurality of carbon atoms arranged in a line. The end of the carbon chain contained in the second atom group 8b is bonded to any one of the plurality of sulfur atoms 10.

The third atom group 8c is an atom group having a urethane bond. The third atom group 8c is, for example, an atom chain containing a urethane bond and carbon. Each of the third atom groups 8c is bonded to any one of the plurality of second atom groups 8b. The third atom group 8c is bonded to the second atom group 8b at both ends or one end.

Figure 3A:
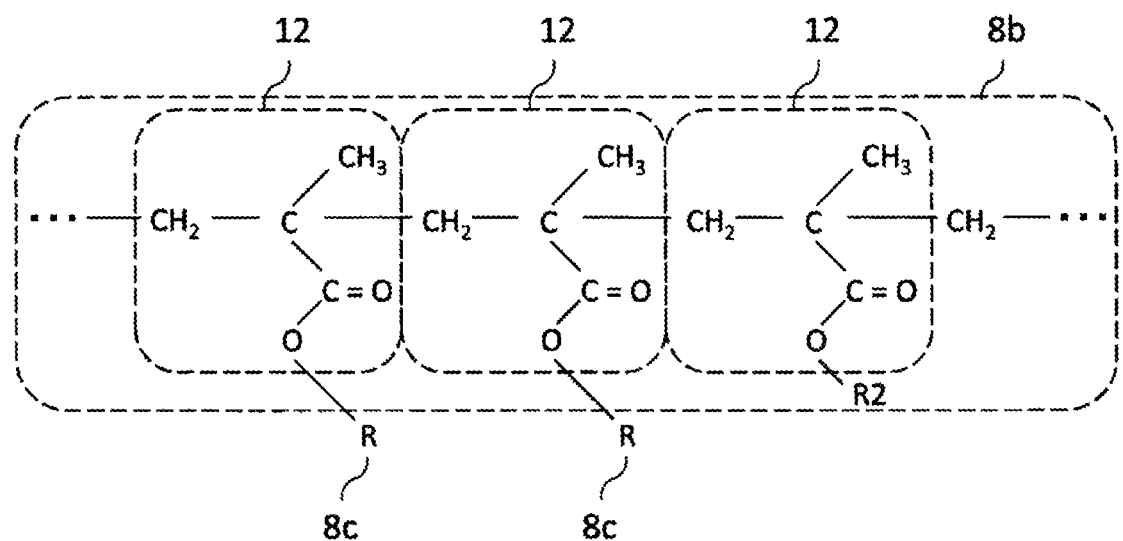
FIG. 3A and FIG. 3B are a diagram for explaining an example of the second atom group.
Figure 3B:
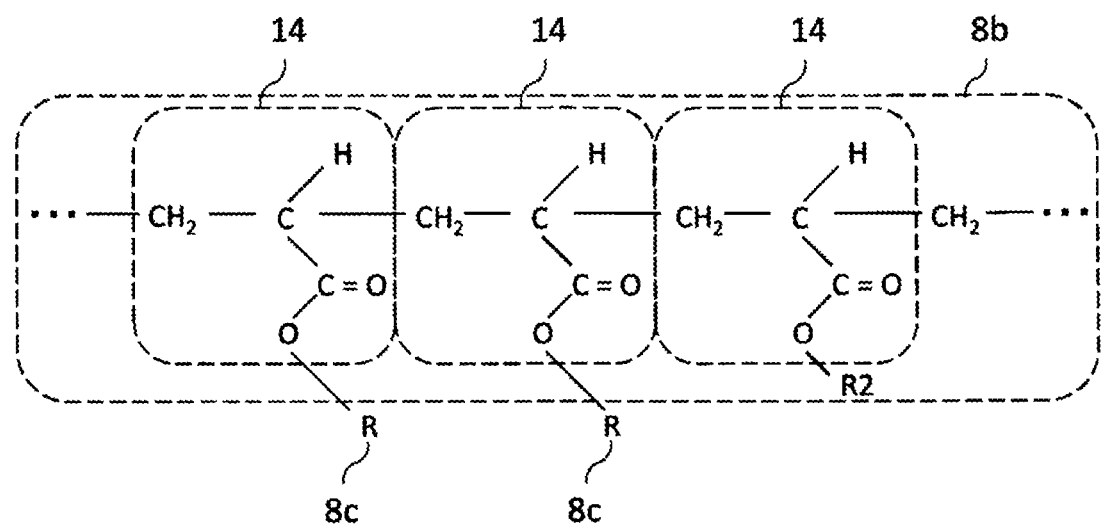

FIG. 3A and FIG. 3B are a diagram for explaining an example of the second atom group 8b. The second atom group 8b is, for example, an atom group having atom groups 12 (hereinafter referred to as methacrylic bond) represented by a chemical formula [—CH$_2$C(CH$_3$)(COO—)—] (see FIG. 3A). Alternatively, the second atom group 8b is an atom group having atom groups 14 (hereinafter referred to as acrylic bond) represented by a chemical formula [—CH$_2$CH(COO—)—] (see FIG. 3B).

That is, the second atom group 8b is, for example, an atom group having an atom group (hereinafter referred to as (meth)acrylic bond) represented by the following formula:

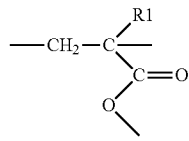

(in the formula, R1 represents hydrogen or a methyl group).

The third atom group 8c is, for example, an atom group R having a urethane bond and bonded to an ester bond (—COO—) of the (meth)acrylic bond 12 or 14. An atom group R2 (for example, a methyl group) other than the third atom group 8c may be bonded to a part of a plurality of (meth)acrylic bond 12 or 14.

—Foamed Resin—

Figure 4A:
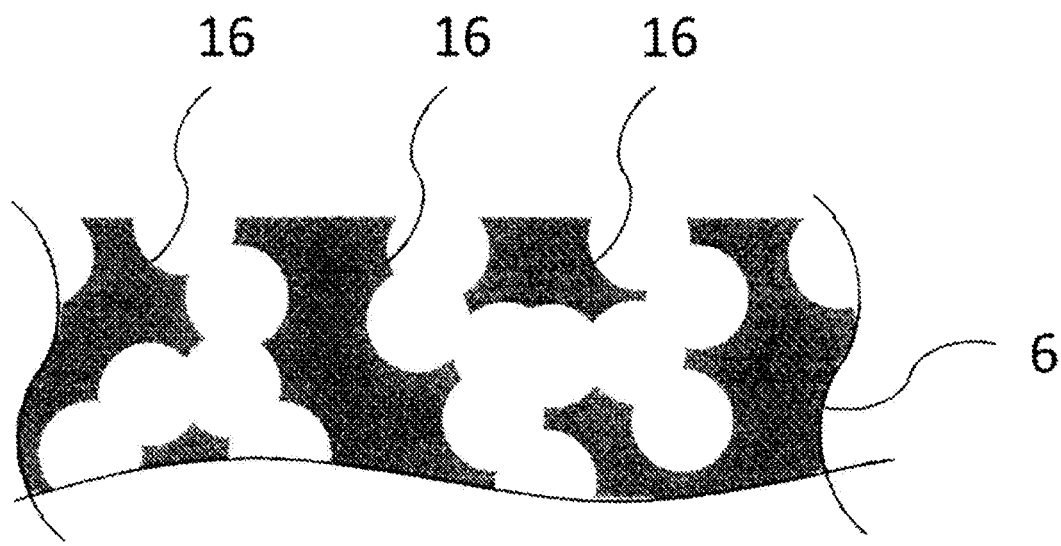
FIG. 4A and FIG. 4B are a diagram for explaining an example of the foamed resin.
Figure 4B:
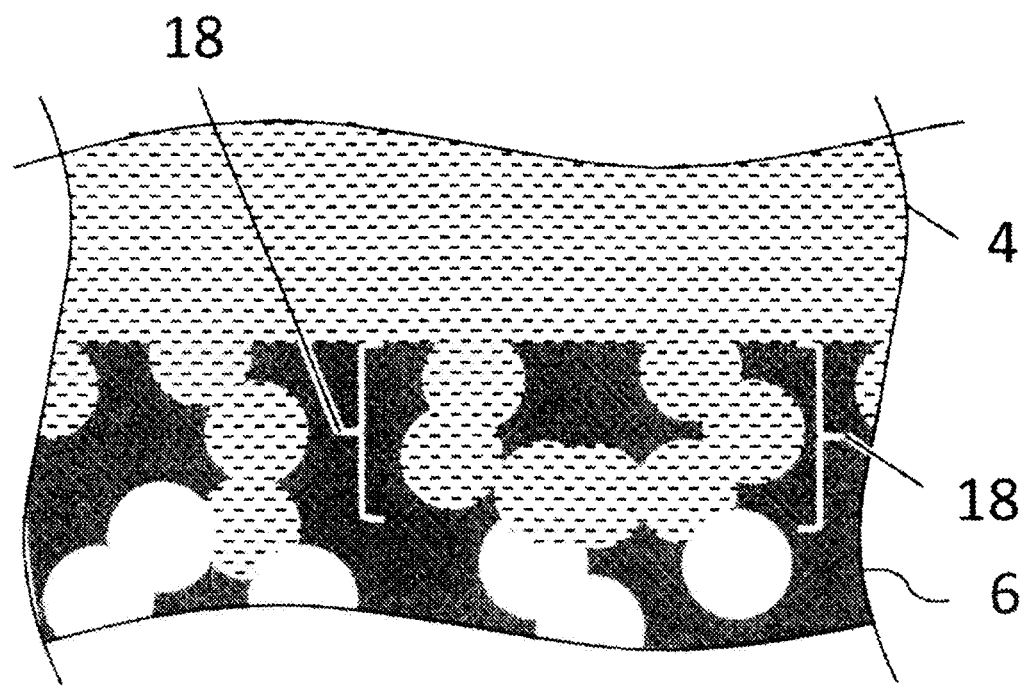

FIG. 4A and FIG. 4B are a diagram for explaining an example of the foamed resin 6. FIG. 4A is a cross-sectional view of a surface layer portion of the foamed resin 6. The foamed resin 6 is preferably a urethane foam having open cell structures 16. The foamed resin 6 may be a foamed resin other than urethane foam (for example, a foamed resin in which the resin portion is any one of natural rubber, butadiene rubber, ethylene propylene rubber, isoprene rubber, nitrile rubber, styrene butadiene rubber, silicone rubber, a polyethylene resin, a polypropylene resin, a polystyrene resin, a (meth)acrylic resin and EVA (Ethylene-vinyl acetate)).

FIG. 4B is a diagram for explaining the state of the foamed resin 6 covered with the resin layer 4. As shown in FIG. 4B, the resin layer 4 preferably has regions 18 formed in the open cell structures 16 of the foamed resin 6. With the regions 18, the resin layer 4 is fixed to the foamed resin 6.

Figure 5A:
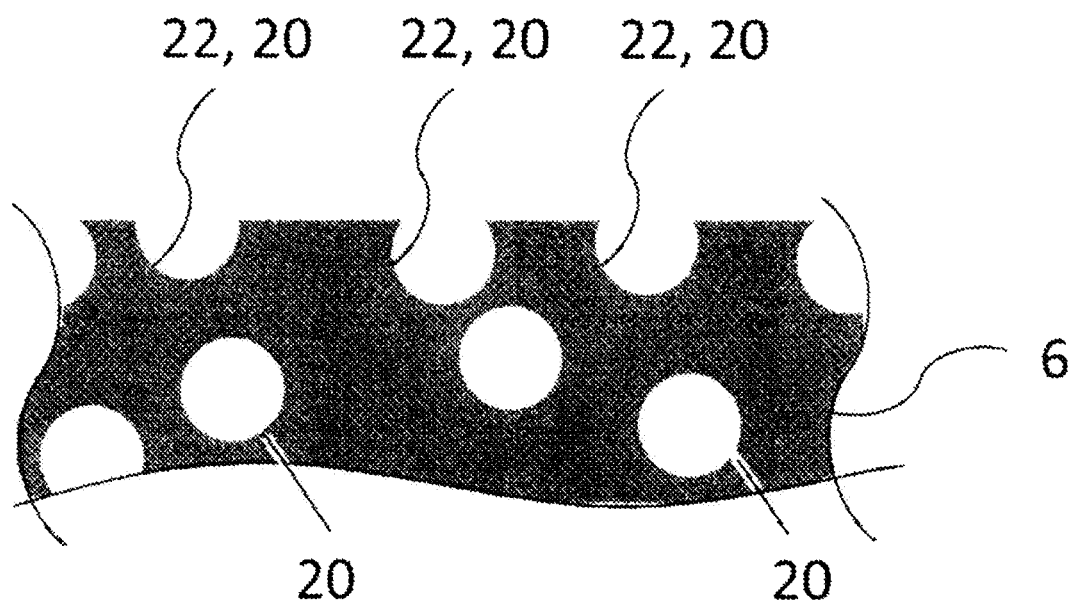
FIG. 5A and FIG. 5B are a diagram for explaining another example of the foamed resin.
Figure 5B:
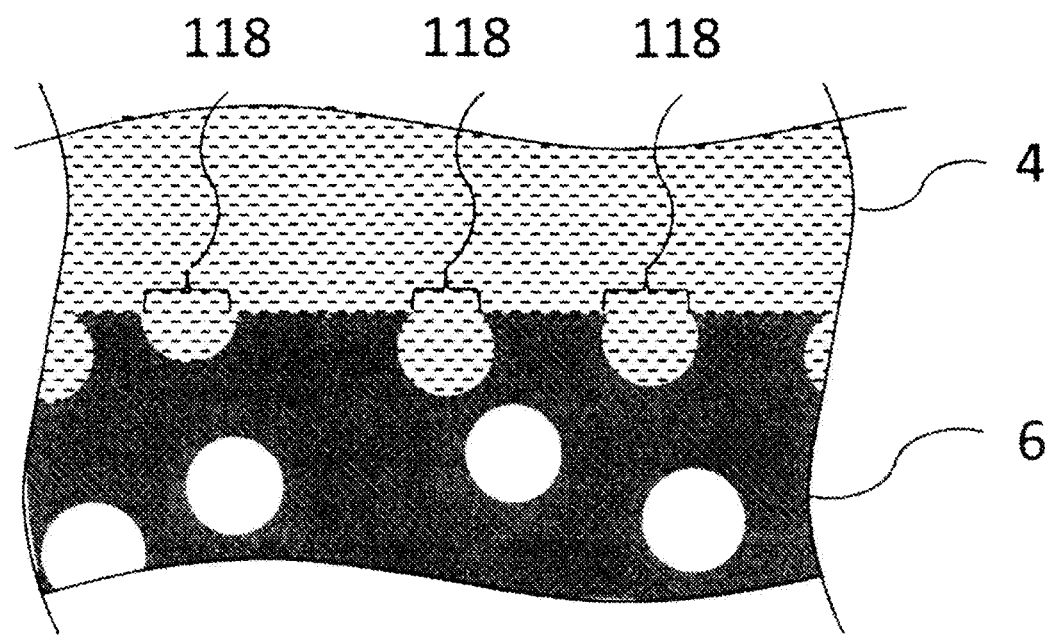

FIG. 5A and FIG. 5B are a diagram for explaining another example of the foamed resin 6. FIG. 5A shows a cross section of the surface layer portion of the foamed resin 6. As shown in FIG. 5A, the foamed resin 6 may be a urethane foam having closed cell structures 20. The surface layer of the foamed resin 6 shown in FIG. 5A is polished. Closed cells 22, which were opened by polishing, are formed on the surface of the foamed resin 6. FIG. 5B is a diagram for explaining the state of the foamed resin 6 covered with the resin layer 4. As shown in FIG. 5B, the resin layer 4 preferably has regions 118 formed in the closed cells 22 as opened. With the regions 118, the resin layer 4 is fixed to the foamed resin 6.

—Abrasion Resistance and Likes—

The paper feed roll 2 according to the first embodiment has high abrasion resistance and a large friction coefficient.

The resin layer 4 of the paper feed roll 2 contains a sulfur bond (—S—) and a urethane bond (—O—CO—NH—). The sulfur bond and the urethane bond are flexible and easily stretchable bonds. Therefore, the resin layer 4 of the paper feed roll 2 is soft and easily stretchable.

Since the resin layer 4 is soft and easily stretchable, even when receiving friction from the paper, the resin layer 4 easily deforms, and the surface layer is hardly damaged. Therefore, the abrasion resistance of the resin layer 4 is high.

Since the resin layer 4 is soft, the resin layer 4 is easily deformed when a compressive load is applied thereto. Thus, the contact area between the resin layer 4 and the substrate is increased. Therefore, the friction coefficient of the resin layer 4 according to the first embodiment is large.

(2) Method of Use

Figure 6:
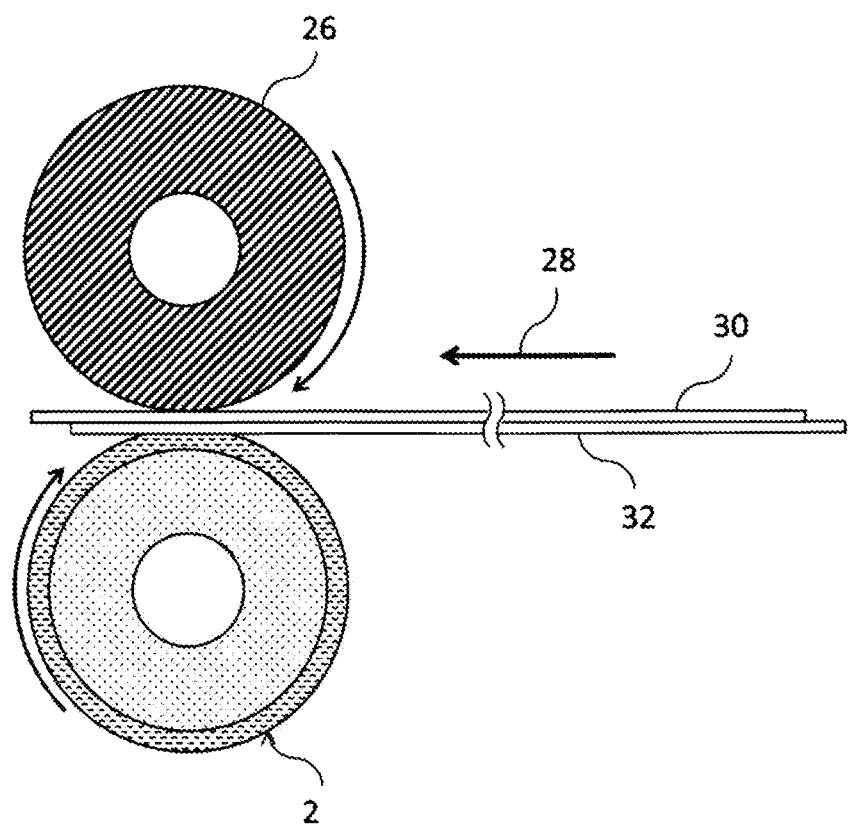
FIG. 6 is a diagram showing an example of a method of using the paper feed roll according to the first embodiment.

FIG. 6 is a diagram showing an example of a method of using the paper feed roll 2 according to the first embodiment. The paper feed roll 2 shown in FIG. 6 is a retard roll. The retard roll is a paper feed roll used for a conveying unit of an image forming apparatus (for example, a printer, a facsimile machine, and a composite machine) for forming an image on a print medium (for example, paper).

The paper feed roll 2 according to the first embodiment is disposed along a feed roll 26. The feed roll 26 is driven to rotate in a paper feed direction 28. On the other hand, the paper feed roll 2 according to the first embodiment is driven to rotate in a direction opposite to the rotation direction of the feed roll 26.

A driving force weaker than the driving force applied to the feed roll 26 is applied to the paper feed roll 2 according to the first embodiment. Therefore, when paper is supplied between the paper feed roll 2 according to the first embodiment and the feed roll 26, the paper is conveyed in the paper feed direction 28 by the feed roll 26.

However, between the paper feed roll 2 and the feed roll 26, two pieces of paper: 30 and 32 may be supplied together due to an operation failure of pickup of the paper.

In this case, the paper 30 on a feed roll 26 side is conveyed in the paper feed direction 28 by the feed roll 26. On the other hand, the paper 32 on a paper feed roll 2 side is conveyed in the direction opposite to the paper feed direction 28 by the paper feed roll 2. As a result, the paper 32 on the paper feed roll 2 side is returned to a paper cassette (not shown). Therefore, malfunction of the image forming apparatus is prevented.

The feed roll 26 and the paper feed roll 2 are pressed by the papers 30 and 32. The feed roll 26 is a roll harder than the paper feed roll 2. Therefore, the feed roll 26 hardly deforms even when being pressed from the papers 30 and 32.

On the other hand, since the foamed resin 6 (for example, urethane foam) of the inner layer in the paper feed roll 2 according to the first embodiment is soft, it is easily deformed when being pressed from the papers 30 and 32. Therefore, according to the first embodiment, the contact area between the paper feed roll 2 and the paper 32 is increased. As a result, the friction coefficient between the paper feed roll 2 and the paper 32 is increased, and it is easy to convey the paper 32 in the opposite direction (direction opposite to the paper feed direction 28).

(3) Manufacturing Method

Figure 7A:
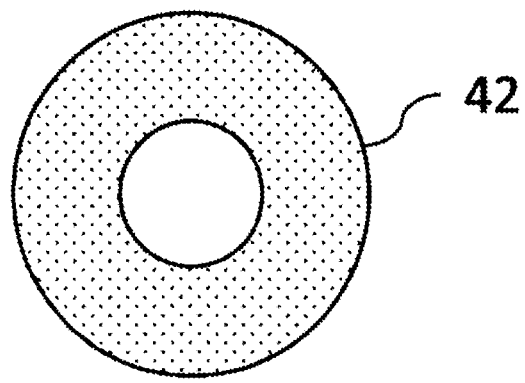
FIG. 7A to FIG. 7C are a process cross-sectional view for explaining a method for manufacturing the paper feed roll.
Figure 7B:
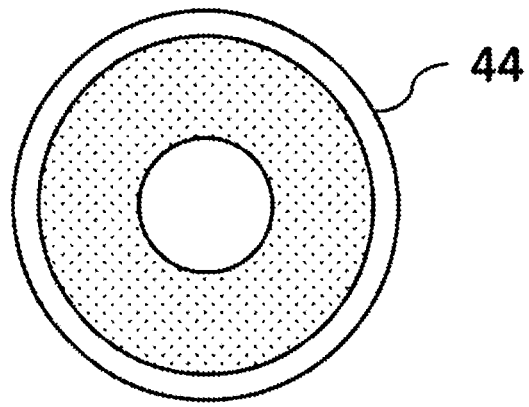
Figure 7C:
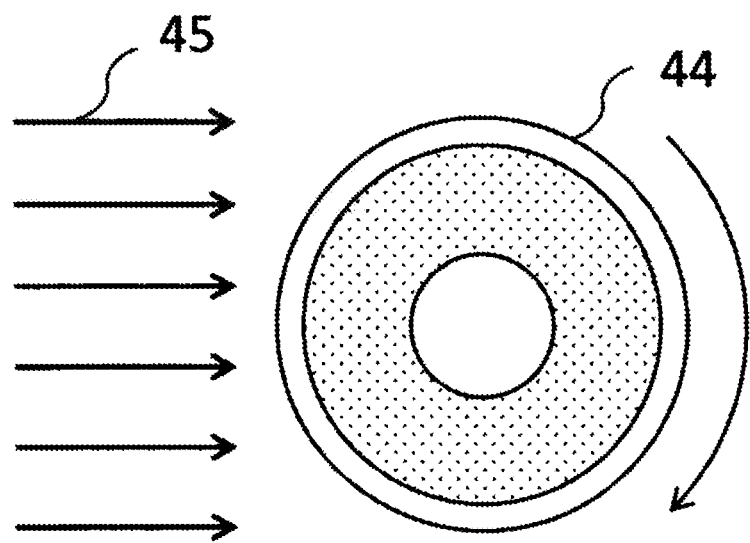

FIG. 7A to FIG. 7C are a process cross-sectional view for explaining a method for manufacturing the paper feed roll 2. FIG. 8A to FIG. 8E are a diagram for explaining an example of a method for generating a prepolymer of the resin layer 4.

(3-1) Generation of Resin Raw Material (See FIG. 8A to FIG. 8E)

For example, a monomer (hereinafter referred to as a first monomer) having an unsaturated bond and a hydroxyl group, an isocyanate having a plurality of isocyanate groups, and a polyol are reacted to generate a prepolymer of the resin layer 4.

In the reaction of generating the prepolymer, the isocyanate group of the isocyanate (see, for example, FIG. 8B) reacts with the hydroxyl group of the first monomer (see, for example, FIG. 8A) to generate a urethane bond. Further, another isocyanate group of the isocyanate (see, for example, FIG. 8B) reacts with the hydroxyl group of the polyol (see, for example, FIG. 8C) to generate another urethane bond.

Figure 8A:
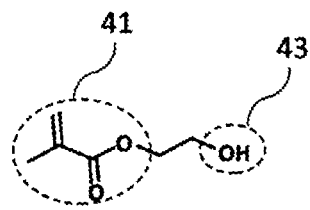
FIG. 8A to FIG. 8E are a diagram for explaining an example of a method for generating a prepolymer of the resin layer.
Figure 8B:
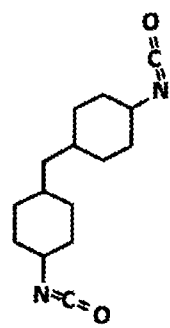
Figure 8C:

The first monomer is, for example, 2-hydroxyethyl methacrylate having the chemical formula of FIG. 8A. The isocyanate is, for example, HMDI (dicyclohexylmethane diisocyanate) having the chemical formula of FIG. 8B. The polyol is, for example, a polyether polyol having the chemical formula of FIG. 8C.

Figure 8D:
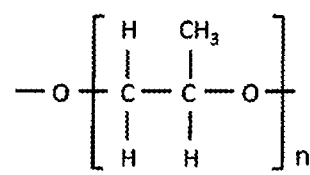
Figure 8E:
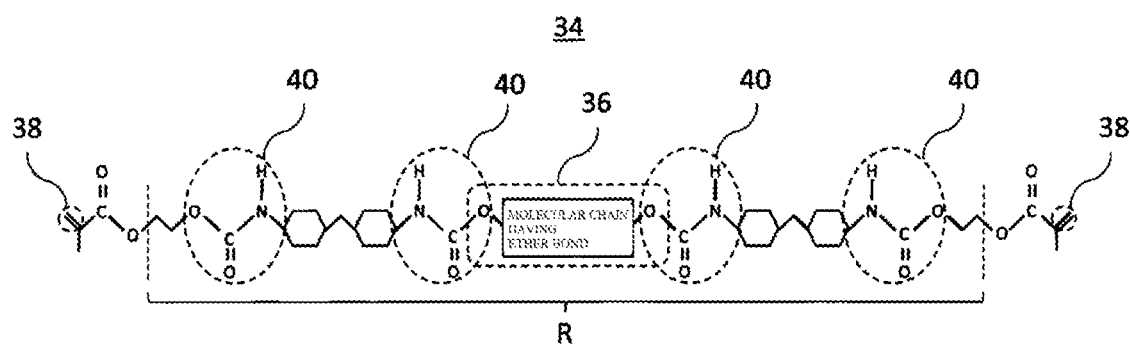

From these raw materials, a prepolymer 34 having the molecular structure shown in FIG. 8E is generated. FIG. 8D shows a chemical formula showing a structure of a central portion 36 of the prepolymer 34. n is an integer of 1 or more. As shown in FIG. 8E, the prepolymer 34 has unsaturated bonds 38 and urethane bonds 40.

A polyfunctional thiol (a compound having a plurality of thiol groups) and a photopolymerization initiator are mixed with the generated prepolymer 34 to generate a raw material of the resin layer 4 (hereinafter referred to as a resin raw material). The prepolymer 34 may be mixed with a monomer for viscosity adjustment. The monomer for viscosity adjustment is, for example, the first monomer.

In the above example, the first monomer (see FIG. 8A) is a monomer having a methacrylic acid group 41 and a hydroxyl group 43. However, the first monomer may be a monomer having an acrylic acid group and a hydroxyl group. That is, the first monomer is, for example, a monomer having a (meth)acrylic acid group and a hydroxyl group.

In addition, in the above example, the prepolymer 34 has a methacrylic acid group (or an acrylic acid group) at both ends. However, the prepolymer 34 may be a polymer having a methacrylic acid group (or an acrylic acid group) at one end and another functional group (for example, a hydroxyl group) at the other end.

(3-2) Application (See FIG. 7A to FIG. 7B)

Next, a cylindrical foam 42 is prepared (see FIG. 7A). The foam 42 is preferably a urethane foam having an open cell structure.

The above resin raw material is applied to the outer surface of the foam 42 (see FIG. 7B).

(3-3) Ultraviolet Irradiation (See FIG. 7C)

After applying the resin raw material 44, the resin raw material 44 is irradiated with ultraviolet rays 45 to cure the resin raw material 44 (see FIG. 7C). By the curing, the resin raw material 44 becomes the resin layer 4 (see FIG. 1). FIG. 9A to FIG. 9F are a diagram for explaining an example of a curing reaction of the resin raw material 44.

(3-3-1) Chain Polymerization by Photopolymerization Initiator

Figure 9A:
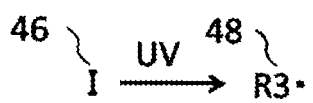
FIG. 9A to FIG. 9F are a diagram for explaining an example of a curing reaction of a resin raw material.
Figure 9B:
Figure 9C:
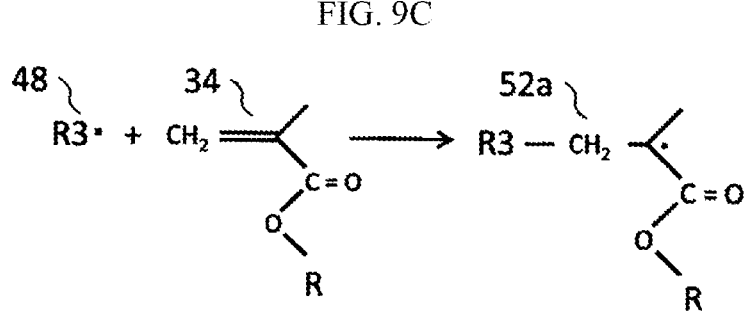
Figure 9D:
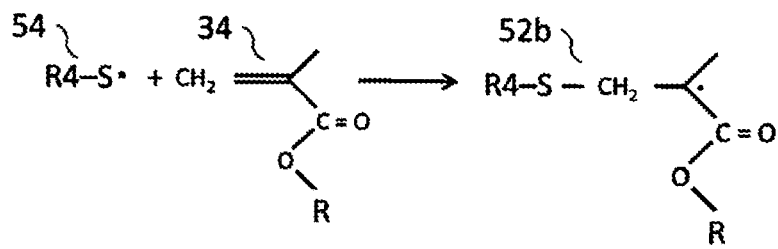

When the resin raw material 44 is irradiated with the ultraviolet rays 45, first, a radical 48 (R3.) is generated from a photopolymerization initiator 46 (see FIG. 9A). R3 is an atom group containing carbon.

The radical 48 (see FIG. 9C) binds to the prepolymer 34 to generate a first growth species 52a. The first growth species 52a grows while polymerizing in a chain reaction (chain polymerization) with the prepolymer 34. The first growth species 52a eventually, for example, binds to another first growth species 52a (containing the grown first growth species, and so forth) or a second growth species 52b (containing the grown second growth species, and so forth) to be described later, to stop the polymerization.

When the first growth species 52a and the second growth species 52b (see FIG. 9D) are bound, a second atom group 108b where one end is bonded to the sulfur atom 10 (see FIG. 2) is generated.

(3-3-2) Chain Transfer Reaction by Thiol Group

A part of the radical 48 (see FIG. 9B) generated from the photopolymerization initiator 46 reacts with a thiol group (—SH) of a polyfunctional thiol 50. By this reaction, a radical 54 (R4-S.) having a sulfur radical is generated. R4 is an atom group containing carbon.

The radical 54 (see FIG. 9D) binds to the prepolymer 34 to generate the second growth species 52b. The second growth species 52b grows while polymerizing in a chain reaction (chain polymerization) with the prepolymer 34. The second growth species 52b eventually binds to, for example, the first growth species 52a or another second growth species 52b to stop the chain polymerization. When the second growth species 52b are bonded to each other, a second atom group 208b having both ends bonded to the sulfur atoms 10 is generated (see FIG. 2). When the second growth species 52b binds to the first growth species 52a, a second atom group 108b (see FIG. 2) having one end bonded to the sulfur atom 10 is generated as described above.

(3-3-3) Prevention of Oxygen Inhibition

Figure 9E:
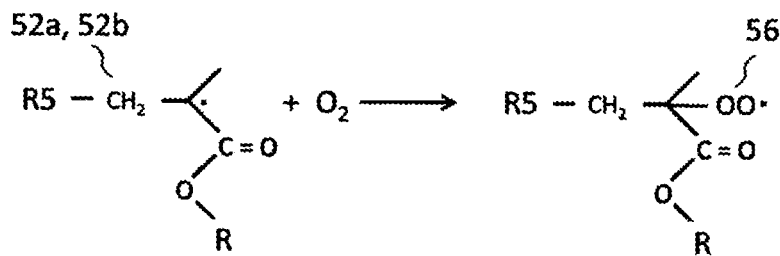
Figure 9F:
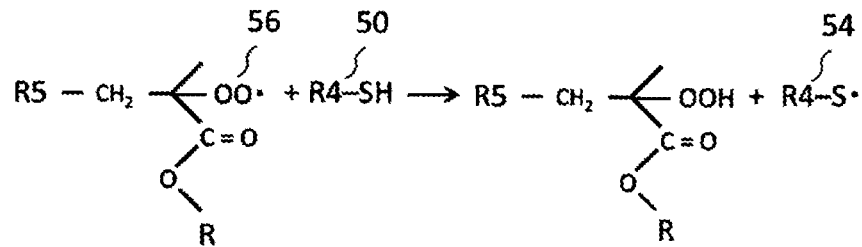

When the resin raw material 44 is irradiated with ultraviolet rays in the atmosphere, radical electrons (.) of the first growth species 52a and the second growth species 52b (see FIG. 9E) react with oxygen in the atmosphere to generate a peroxy radical 56 (OO.) (see FIG. 9E). The R5 in FIG. 9E is an atom chain containing carbon. Specifically, R5 is an atom chain generated by chain polymerization. The peroxy radical 56 is an inactive radical. Therefore, the peroxy radical 56 does not bind to the prepolymer 34.

Thus, when the peroxy radical 56 is generated, the chain polymerization stops before the second atom group 8b grows sufficiently. As a result, a large amount of unreacted prepolymers are generated and the resin raw material 44 causes curing failure. Such termination of chain polymerization (hereinafter referred to as oxygen inhibition) tends to occur at the surface layer of the resin layer 4. Since the surface layer where oxygen inhibition has occurred is sticky, it is not suitable for the outer layer of the paper feed roll.

However, in the first embodiment, the thiol group of the polyfunctional thiol 50 (see FIG. 9F) reacts with the peroxy radical 56 to generate the radical 54 (R4-S.) having a sulfur radical. The radical 54 (R4-S.) having a sulfur radical reacts with the prepolymer 34 to generate the second growth species 52*b* (see FIG. 9D). The generated second growth species 52*b* polymerizes in a chain reaction with the prepolymer 34 to finally generate the second atom groups 108*b* and 208*b* having at least one end bonded to sulfur. That is, the radical activity of the peroxy radical 56 transfers to the thiol group of the polyfunctional thiol, and the chain polymerization resumes (chain transfer reaction). Therefore, according to the first embodiment, the resin raw material 44 does not cause curing failure.

According to the first embodiment, by the curing reaction described with reference to FIG. 9A to FIG. 9F, the resin layer 4 containing both a sulfur bond and a urethane bond is formed. Therefore, according to the first embodiment, a paper feed roll 2 having high abrasion resistance and a large friction coefficient can be obtained.

Incidentally, the radical 54 (see FIG. 9D) is a radical in which the thiol group of the polyfunctional thiol 50 is activated. Therefore, the reaction between the radical 54 and the prepolymer 34 (see FIG. 9D) is an ene-thiol reaction.

As described above, the monomer for viscosity adjustment may be mixed with the raw material of the resin layer 4. The monomer for viscosity adjustment is, for example, the first monomer having an unsaturated bond and a hydroxyl group. In this case, the first monomer is incorporated into the second atom group 8*b* (see FIG. 3A). In FIG. 3A, the partial structure (the partial structure at the right end in FIG. 3A) in which the atom group R2 is bonded to the ester group of the atom group 12 is the first monomer incorporated in the second atom group 8*b*.

(3-4) Cutting

After the ultraviolet irradiation, the foam 42 is cut into a predetermined length, and the paper feed roll 2 is obtained.

(4) Modification

Figure 10:
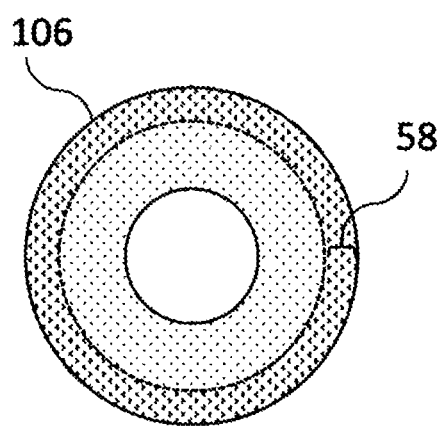
FIG. 10 is a diagram for explaining a modification of the first embodiment.

FIG. 10 is a diagram for explaining a modification 102 of the first embodiment.

The modification 102 is a paper feed roll having a cylindrical foamed resin 106 provided with a skin layer 58. The skin layer 58 is a layer in which a resin having the first to third atom groups 8*a* to 8*c* has penetrated into a cell structure (porous structure) located on the outer surface side of the foamed resin 106. As the paper feed roll 2 of FIG. 1, the modification 102 also has high abrasion resistance and a large friction coefficient based on the excellent flexibility of the resin. The foamed resin 106 is preferably a urethane foam (for example, a urethane foam having open cells) in a state where a porous cell structure is exposed on the outer surface.

The modification 102 can be formed by substantially the same procedure as the manufacturing method described with reference to FIG. 7A to FIG. 7C. However, the viscosity of the resin raw material is adjusted such that the resin raw material easily penetrates into the cell structure of the foamed resin 106. Specifically, the viscosity of the resin raw material is adjusted to be low by increasing the raw material temperature and increasing the weight ratio of the monomer for viscosity adjustment.

The thickness of the skin layer 58 is, for example, 2000 μm or less. When the A hardness (JIS-A hardness) of the resin raw material after curing is 50 or less, the thickness of the skin layer 58 is preferably 300 μm to 600 μm.

In the above example, the first monomer used for generating the prepolymer 34 is a monomer having a (meth) acrylic acid group and a hydroxyl group. However, the first monomer may be a monomer having a functional group other than the (meth)acrylic acid group and a hydroxyl group. For example, the first monomer may be a monomer having a vinyl group and a hydroxyl group or a monomer having an ethynyl group and a hydroxyl group.

EXAMPLES

Hereinafter, examples of the present invention will be described, but the present invention is not limited to these examples.

(1) Examples 1 to 21

FIG. 11 shows Tables 1 and 2 summarizing Examples 1 to 21. The 2nd to 4th rows of Tables 1 and 2 are the components of the resin raw material used in each example. The 5th to 6th rows of Tables 1 and 2 are the A hardness (JIS-A hardness) and the application thickness of the resin layer 4 formed in each example, respectively.

The 7th to 9th rows of Tables 1 and 2 are static friction coefficient, compressive load and abrasion amount of the paper feed roll 2 formed in each example, respectively. The 10th row of Tables 1 and 2 is the result of determining the possibility whether the paper feed roll 2 can be used as a retard roll. The abrasion amount is measured by a Taber abrasion test (JIS K7204). The determination criteria of the possibility whether the paper feed roll can be used as a retard roll (hereinafter referred to as determination criteria) and the method of measuring the compressive load will be described later.

Example 1

In Example 1, as shown in the 2nd to 4th rows of Table 1, a resin raw material is used, which is obtained by adding 5 parts by weight of PEMP (pentaerythritol tetrakis(3-mercaptopropionate)) and 1 part by weight of a photopolymerization initiator Irgacure 1173 to 100 parts by weight of a first prepolymer PP1. Irgacure 1173 is a photopolymerization initiator manufactured by BASF. PEMP is a tetra-functional thiol. The temperature of the resin raw material is adjusted and the resin raw material is mixed with a (meth) acrylic monomer, such that the viscosity is 30 Pa·s to 200 Pa·s. Instead of the (meth)acrylic monomer, a monomer having a carbon double bond may be mixed (the same in Examples 2 to 21 and Examples 22 to 24 to be described later).

As shown in FIG. 7A to FIG. 7B, the resin raw material is applied to the surface of the cylindrical urethane foam 42 by, for example, 0.3 mm (see the 6th row of Table 1).

Thereafter, while rotating the urethane foam 42 to which the resin raw material was applied, the resin raw material 44 is irradiated with the ultraviolet rays 45 (see FIG. 7C). The intensity of the ultraviolet rays is, for example, 150 mW/cm$^2$. The integrated amount of light of the ultraviolet rays is, for example, 800 mJ/cm$^2$. The A hardness of the resin raw material 44 (that is, the resin layer 4) after ultraviolet irradiation is 30 (see the 5th row of Table 1). The A hardness of the resin layer 4 varies depending on the molecular weight of the polyol contained in a prepolymer raw material to be described later. Finally, the urethane foam 42 is cut into a predetermined length, and the paper feed roll 2 is obtained.

The static friction coefficient of the paper feed roll 2 of Example 1 is 2.42 (see the 7th row of Table 1). The compressive load is 0.30 kg/36 mm (see the 8th row of Table 1). The abrasion amount is 2.1 mg (see the 9th row of Table 1). The determination result is only just pass (A) (see the 10th row of Table 1).

Examples 2 to 21

In Examples 2 to 21, as in Example 1, paper feed rolls are formed according to the resin raw materials and the application thicknesses shown in Tables 1 and 2, and the characteristics of the formed paper feed rolls are measured. Further, based on the measurement results, the possibility whether the paper feed roll can be used as a retard roll is determined.

Examples 1 to 21 are divided into 8 groups. All the examples in the same group use the same prepolymer. On the other hand, in the same group, the application thickness differs for each example.

—Generation of Prepolymer—

FIG. 12 shows Table 3 for explaining raw materials of prepolymers used in Examples 1 to 21. FIG. 12 also shows raw materials of prepolymers used in Examples 22 to 24 to be described later. For example, the first prepolymer PP1 is generated by reacting 2.6 parts by weight of 2-hydroxyethyl methacrylate, 5.5 parts by weight of HMDI and 100 parts by weight of Premnol S4011. 2-hydroxyethyl methacrylate is a methacrylic acid monomer manufactured by Nippon Shokubai Co., Ltd. or the like. HMDI is an abbreviation for dicyclohexylmethane diisocyanate. Premnol S4011 is a trade name of polyether polyol manufactured by AGC Inc. The molecular weight of Premnol S4011 is 10,000.

The prepolymer PP1 is generated, for example, by the following procedures. First, HMDI ("isocyanate" in Table 3) and Premnol S4011 ("polyol" in Table 3) are mixed, and heating is continued until the content ratio of the isocyanate group in the reaction product (hereinafter referred to as first reaction product) is 0.7% to 0.9% ("first target value of NCO %" in Table 3). Thereafter, 2-hydroxyethyl methacrylate ("monomer having an unsaturated bond and a hydroxyl group" in Table 3) is added to the first reaction product, and the obtained product is left at room temperature until the content ratio of the isocyanate group in the reaction product (hereinafter referred to as the second reaction product) is 0.1% or less ("second target value of NCO %" in Table 3).

Accordingly, the first prepolymer PP1 which is the second reaction product is generated. The content ratio of the isocyanate group is measured by a polyurethane raw material aromatic isocyanate test method prescribed in JIS Z 1603-1:2007.

The prepolymers PP1 to PP5 of Examples 1 to 18 are polymers generated by reacting a monomer having a (meth) acrylic acid group and a hydroxyl group, an isocyanate, and a polyol. The prepolymer PP6 of Example 19 is a polymer generated by reacting a monomer having an ethynyl group and a hydroxyl group, an isocyanate, and a polyol. The prepolymers PP7 and PP8 of Examples 20 and 21 are a polymer generated by reacting a monomer having a vinyl group and a hydroxyl group, an isocyanate, and a polyol.

—Method of Measuring Compressive Load—

Figure 13:
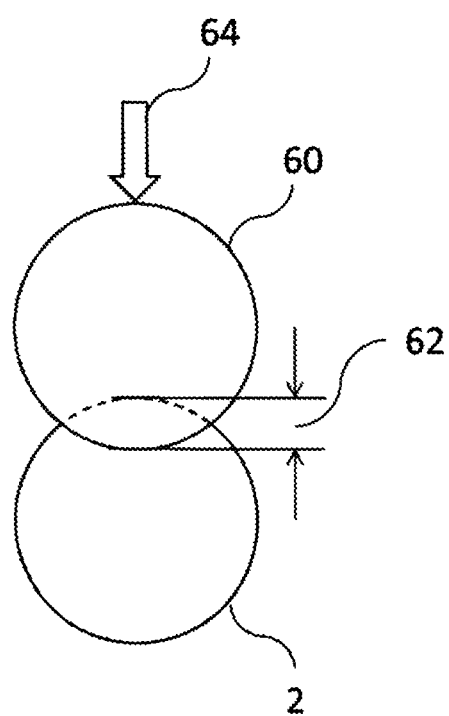
FIG. 13 is a diagram for explaining a method of measuring a compressive load.

FIG. 13 is a diagram for explaining a method of measuring a compressive load.

First, a roll 60 (hereinafter referred to as a hard roll) which is sufficiently harder than the paper feed roll 2 is pressed against the paper feed roll 2. Under this state, while feeding the paper feed roll 2 and the hard roll 60 at 60 revolutions per minute, a force 64 is applied to the roll 60, such that a crush amount 62 of the paper feed roll 2 is 2.8 mm. The force 64 is the compressive load of the paper feed roll 2. The diameter of the paper feed roll 2 is 32 mm. The compressive load is the force per 36 mm length in the axial direction of the paper feed roll 2.

—Determination Criteria—

The possibility whether the paper feed roll 2 can be used as a retard roll is determined according to the following criteria. First, a pass or failure of each of the static friction coefficient, the compressive load and the abrasion amount is determined. The determination result is any one of a pass (○), only just pass (Δ) and failure (x). When all of the static friction coefficient, the compressive load and the abrasion amount are a pass, it is determined that the paper feed roll 2 can be used as a retard roll (○). When one of the static friction coefficient, the compressive load and the abrasion amount is a failure, it is determined that the paper feed roll 2 cannot be used as a retard roll (x). When there is no characteristic determined to be a failure (x) and one of the static friction coefficient, the compressive load and the abrasion amount is only just pass (Δ), it is determined that the paper feed roll 2 can be only just used as a retard roll (Δ).

When the static friction coefficient is 1.5 or more, the static friction coefficient is determined to be a pass. When the static friction coefficient is less than 1.5 and 1.0 or more, the static friction coefficient is determined to be only just pass. When the static friction coefficient is less than 1.0, the static friction coefficient is determined to be a failure. The standard value of the friction coefficient of the retard roll is 1.0.

When the compressive load is within the range of 0.31 kg/36 mm to 0.35 kg/36 mm, the compressive load is determined to be pass. When the compressive load is not within the range of 0.31 kg/36 mm to 0.35 kg/36 mm, but within the range of 0.30 kg/36 mm to 0.37 kg/36 mm, the compressive load is determined to be only just pass. When the compressive load is not within the range of 0.30 kg/36 mm to 0.37 kg/36 mm, the compressive load is determined to be a failure. The standard value of the compressive load of the retard roll is within 0.33±0.02 kg/36 mm.

When the abrasion amount is 26.0 mg or less, the abrasion amount is determined to be a pass. When the abrasion amount is larger than 26.0 mg, the abrasion amount is determined to be a failure. The criterion for determining the abrasion amount is the abrasion amount of the paper feed roll (Comparative Example 19 to be described later) in which the resin layer 4 is formed of silicone.

As shown in Tables 1 and 2, the paper feed rolls of Examples 1 to 10, and 19 to 21 are pass or only just pass as retard rolls.

(2) Comparative Examples 1 to 20

FIG. 14 shows Tables 4 and 5 summarizing Comparative Examples 1 to 20. The 2nd and 3th rows of Tables 4 and 5 are the components of the resin raw material used in each comparative example. The 4th and 5th rows of Tables 4 and 5 are the A hardness (JIS-A hardness) and the application thickness of the resin layer 4 formed in each comparative example.

The 6th to 8th rows of Tables 4 and 5 are respectively static friction coefficient, compressive load and abrasion amount of the paper feed roll formed in each comparative example. The 9th row of Tables 4 and 5 is the result of determining the possibility whether the paper feed roll can be used as a retard roll.

The resin raw material of the n-th comparative example (1<n<18) is obtained by removing polyfunctional thiol from the resin raw material of the n-th example. The application thickness of the n-th comparative example (1<n<18) is the same as the application thickness of the n-th example. The manufacturing methods of Comparative Examples 1 to 18 are the same as those of Example 1 except for the resin raw material.

The resin raw materials of Comparative Examples 19 to 20 are silicone. The manufacturing methods of Comparative Examples 19 to 20 are the same as those of Example 1 except for the resin raw material, application thickness and curing method.

The resin raw materials of Comparative Examples 1 to 18 do not contain a compound having a thiol group. Therefore, the surface layers of the resin layers 4 of Comparative Examples 1 to 18 are sticky due to the unreacted prepolymer. Thus, the static friction coefficient and the like are measured after removing the sticky surface layer, for example, by polishing.

Figure 15:
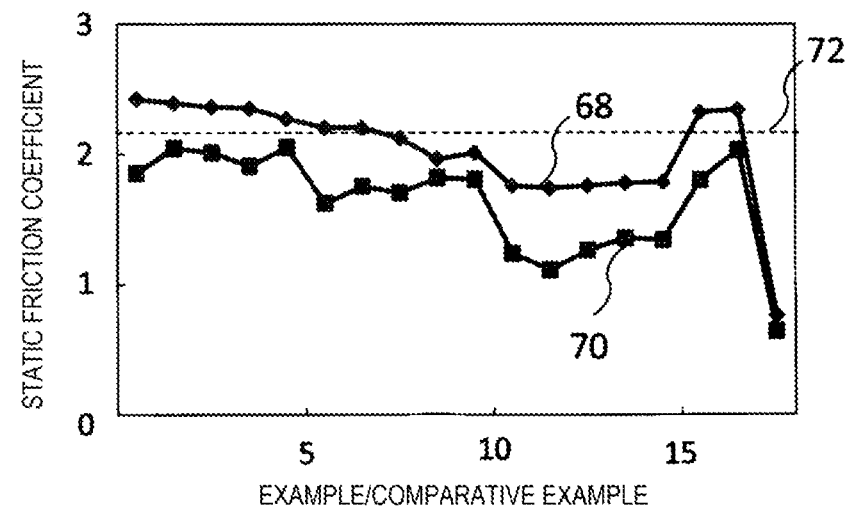
FIG. 15 is a diagram showing a relationship between static friction coefficients of Examples 1 to 18 and static friction coefficients of Comparative Examples 1 to 18.

FIG. 15 is a diagram showing a relationship between static friction coefficients 68 of Examples 1 to 18 and static friction coefficients 70 of Comparative Examples 1 to 18. The vertical axis represents the static friction coefficient. The horizontal axis represents the number of Example and Comparative Example.

FIG. 15 also shows the static friction coefficient 72 of the resin layer 4 (Comparative Example 19) formed of silicone. The paper feed roll of Comparative Example 19 is widely used as a retard roll (see, for example, Patent Document 3).

As shown in FIG. 15, the static friction coefficients 68 of the paper feed rolls 2 according to Examples 1 to 7 can be made larger than the static friction coefficient of the silicone-type paper feed roll (comparative example 19). Further, the static friction coefficients 68 of the paper feed rolls 2 according to Examples 1 to 18 can be made larger than the static friction coefficients 70 of the paper feed rolls (Comparative Examples 1 to 18) formed of a resin raw material not containing a compound having a thiol group.

The resin layers of Comparative Examples 1 to 18 and Examples 1 to 18 can be formed in a much shorter time than the resin layers of the silicone-type paper feed rollers (Comparative Examples 19 to 20). The silicone cures after a long drying time. On the other hand, the resin raw materials of Examples 1 to 18 and Comparative Examples 1 to 18 are cured by ultraviolet irradiation for a short time. Therefore, the productivity of Examples 1 to 18 and Comparative Examples 1 to 18 is much higher than that of the silicone-type paper feed rollers (Comparative Examples 19 to 20).

Figure 16:
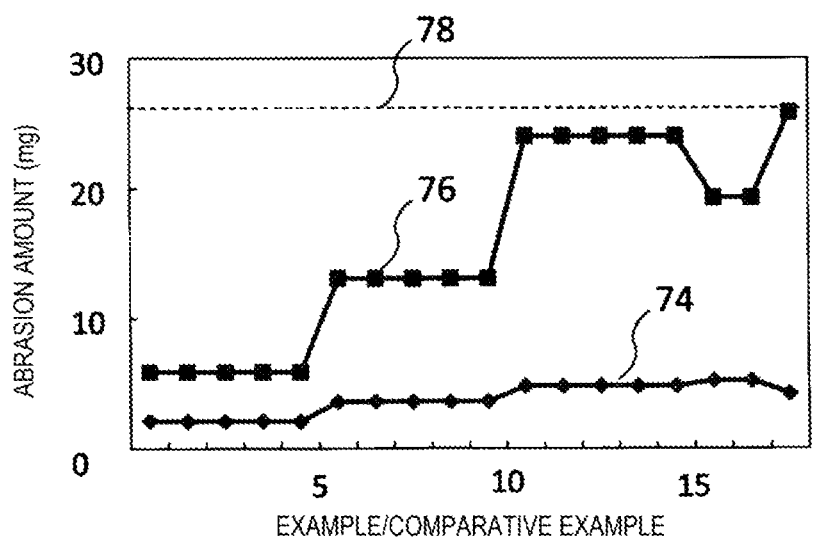
FIG. 16 is a diagram showing a relationship between abrasion amounts of Examples 1 to 18 and abrasion amounts of Comparative Examples 1 to 18.

FIG. 16 is a diagram showing a relationship between abrasion amounts 74 of Examples 1 to 18 and abrasion amounts 76 of Comparative Examples 1 to 18. The vertical axis represents the abrasion amount. The horizontal axis represents the number of Example and Comparative Example.

FIG. 16 also shows the abrasion amount 78 of the silicone-type paper feed roll (Comparative Example 19). As shown in FIG. 16, according to Examples 1 to 18, a paper feed roll can be provided, of which the abrasion amount is significantly smaller than that of the silicone-type paper feed roll. Further, according to Examples 1 to 18, a paper feed roll 2 having much smaller abrasion amount than those of Comparative Examples 1 to 18 can be provided.

As is apparent from the comparison between Tables 1 to 2 and Tables 4 to 5, the compressive loads of Examples 1 to 18 are slightly smaller than the compressive loads of Comparative Examples 1 to 18. This result shows that the resin layers 4 of Examples 1 to 18 are softened due to the sulfur bond. The softness of the resin layers of Examples 1 to 18 is also apparent from the following measurements.

The maximum point stress (stress when the resin ruptures) and the maximum point displacement (elongation rate when the resin ruptures) of the resin layers of Examples 6 to 10 and the resin layers of Comparative Examples 6 to 10 are measured. The maximum point stress and the maximum point displacement of the resin layers of Examples 6 to 10 are 1.9 MPa and 191%, respectively. On the other hand, the maximum point stress and the maximum point displacement of Comparative Examples 6 to 10 are 2.4 MPa and 149%, respectively.

Therefore, the resin layers of Examples 6 to 10 elongates more than the resin layers of Comparative Examples 6 to 10 with a tensile stress smaller than that of the resin layers of Comparative Examples 6 to 10. That is, the resin layers of Examples 6 to 10 are softer than the resin layers of Comparative Examples 6 to 10. The softness of the resin layers of Examples 6 to 10 is considered to be due to the flexibility of the sulfur bonds bonded to the ends of the second atom group 8b.

In Examples 19 to 21, a prepolymer formed of a monomer having a vinyl group or an ethynyl group is used. Also according to Examples 19 to 21, paper feed rolls 2 having abrasion amounts (25.3 mg, 4.4 mg, and 19.3 mg, respectively) smaller than the abrasion amount (26 mg) of the silicone-type paper feed roll (Comparative Example 19) can be provided (See Table 2).

(3) Examples 22 to 24 and Comparative Examples 22 to 24

FIG. 17 shows Table 6 summarizing Examples 22 to 24. FIG. 17 also shows Table 7 summarizing Comparative Examples 22 to 24 corresponding to Examples 22 to 24.

Examples 22 to 24

The polyfunctional thiol, initiator, hardness and application thickness of Examples 22 to 24 (see Table 6 in FIG. 17) are the same as the polyfunctional thiol, initiator, hardness and application thickness of Examples 6, 8 and 10 (see Table 1 in FIG. 11), respectively. On the other hand, the prepolymer PP9 of Examples 22 to 24 is a polymer different from the prepolymer PP2 of Examples 6, 8, and 10.

The prepolymer PP2 of Examples 6, 8, and 10 is generated from a monomer having a methacrylic acid group and a hydroxyl group (specifically, 2-hydroxyethyl methacrylate), a polyol and an isocyanate (see Table 3 in FIG. 12). Thus, the second atom group 8b (see FIG. 2) of the resin layer 4 generated in Examples 6, 8, and 10 is an atom group having a methacrylic bond 12 (see FIG. 3A).

On the other hand, the prepolymer PP9 of Examples 22 to 24 is generated from a monomer having an acrylic acid group and a hydroxyl group (specifically, 2-hydroxyethyl acrylate) (see Table 3 in FIG. 12). Thus, the second atom group 8b (see FIG. 2) of the resin layer 4 generated in Examples 22 to 24 is an atom group having an acrylic bond 14 (see FIG. 3B).

The characteristics (see "static friction coefficient", "compressive load" and "abrasion amount" in Table 6 of FIG. 17) of the paper feed roll of Example 22 are substantially the same as the characteristics (see "static friction coefficient", "compressive load" and "abrasion amount" in Table 1 of FIG. 11) of the paper feed roll of Example 6. Similarly, the characteristics of the paper feed rolls of Examples 23 and 24 are substantially the same as those of the paper feed rolls of Examples 8 and 10, respectively.

Therefore, according to Examples 22 to 24, as in Examples 6, 8, and 10 in which the second atom group 8b has the methacrylic bond 12, a paper feed roll where abrasion amount is significantly smaller than that of the silicone-type sheet feeding roll (see Comparative Example 19 in Table 5 of FIG. 14), can be provided.

Comparative Examples 22 to 24

Resin raw materials of Comparative Examples 22 to 24 are those obtained by removing polyfunctional thiol from the resin raw materials of Examples 22 to 24 (see FIG. 17). The initiator, hardness and application thickness of Comparative Examples 22 to 24 are the same as the initiator, the hardness and the application thickness of Examples 22 to 24, respectively.

As shown in FIG. 17, according to Examples 22 to 24, a paper feed roll having much smaller abrasion amounts than those of the paper feed rolls (Comparative Examples 22 to 24) formed of a resin raw material not containing polyfunctional thiol (compound having a plurality of thiol groups) can be provided. Further, the static friction coefficients of the paper feed rolls according to Examples 22 to 24 can be made larger than the static friction coefficients of the paper feed rolls (Comparative Examples 22 to 24) formed of a resin raw material not containing a polyfunctional thiol.

Although the first embodiment and Examples of the present invention have been described above, the first embodiment and Examples are illustrative and not restrictive.

For example, the polyfunctional thiol in Examples is PEMP which is a tetrafunctional thiol. However, the polyfunctional thiol of the present invention may be a thiol other than PEMP. For example, the polyfunctional thiol of the present invention may be any one of EGMP-4 (tetraethylene glycol bis(3-mercaptopropionate), a bifunctional thiol), TMMP (trimethylolpropane tris(3-mercaptopropionate), a trifunctional thiol), and DPMP (dipentaerythritol hexakis (3-mercaptopropionate), a hexafunctional thiol), which have a primary thiol group. Further, the polyfunctional thiol of the present invention may be any one of Karenz MT_BD1 (bifunctional thiol) and Karenz MT_PE1 (tetrafunctional thiol), whcih have a secondary thiol group. Karenz MT_PE1 and Karenz MT_BD1 are trade names of thiols manufactured by SHOWA DENKO K.K.

The monomers having a vinyl group and a hydroxyl group in Examples 20 to 21 are HBVE or allyl alcohol. However, the monomer having a vinyl group and a hydroxyl group may be either ethylene glycol monovinyl ether or diethylene glycol monovinyl ether.

The monomer having an ethynyl group and a hydroxyl group in Example 19 is propargyl alcohol. However, the monomer having an ethynyl group and a hydroxyl group may be any one of 3-butyn-1-ol, 5-hexyne-3-ol and 4-pentyn-2-ol.

The resin according to the first embodiment is excellent in static friction coefficient and abrasion resistance. Therefore, the resin according to the first embodiment may be used for a paper feed roll other than a retard roll. For example, the resin according to the first embodiment may be used as an outer layer of a feed roll or a pickup roll.

The resin according to the first embodiment has high flexibility and excellent abrasion resistance. Therefore, the resin according to the first embodiment may be used for a device (for example, a sealing material) other than the paper feed roll.

While the present invention has been described in detail with reference to specific embodiments, it will be apparent to those skilled in the art that various changes and modifications can be made without departing from the spirit and scope of the present invention.

INDUSTRIAL APPLICABILITY

The roll according to one aspect of the present invention can be used as a paper feed roll for conveying paper in an image forming apparatus such as a copying machine, a printer, a facsimile machine, and a composite machine.

REFERENCE SIGNS LIST

2 Paper feed roll
4 Resin layer
6 Foamed resin
8a First atom group
8b Second atom group
8c Third atom group
10 Sulfur atom
16 Open cell structure
20 Closed cell structure
34 Prepolymer
38 Unsaturated bond
40 Urethane bond
41 Methacrylic acid group
42 Foam
43 Hydroxyl group
45 Ultraviolet ray
50 Polyfunctional thiol
58 Skin layer

The invention claimed is:

1. A roll, comprising:
a resin layer containing a first atom group having a plurality of sulfur atoms, a plurality of second atom groups having a carbon chain that has a plurality of carbon atoms arranged in a line and has an end bonded to any one of the plurality of sulfur atoms, and a plurality of third atom groups each of which has a urethane bond and is bonded to any one of the plurality of second atom groups; and
a cylindrical foamed resin having an outer surface covered with the resin layer,
wherein the second atom groups contain a (meth)acrylic bond represented by the following formula:

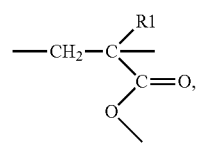

wherein in the formula, R1 represents hydrogen or a methyl group, and
the third atom groups are bonded to an ester bond of the (meth)acrylic bond directly.

2. The roll according to claim 1, wherein the resin layer has a region formed in an open or opened cell structure of the foamed resin.

3. The roll according to claim 1, wherein the foamed resin is a urethane foam having an open cell structure.

4. The roll according to claim, 1, which is a retard roll used for a conveying unit of an image forming apparatus for forming an image on a print medium.

5. The roll according to claim 1, wherein the plurality of second atom groups is a plurality of fluorine-free second atom groups.

6. A roll, comprising:
a resin containing a first atom group having a plurality of sulfur atoms, a plurality of second atom groups having a carbon chain that has a plurality of carbon atoms arranged in a line and has an end bonded to any one of the plurality of sulfur atoms, and a plurality of third atom groups each of which has a urethane bond and is bonded to any one of the plurality of second atom groups; and
a cylindrical foamed resin impregnated with the resin in an open or opened porous cell structure on an outer surface,
wherein the second atom groups contain a (meth)acrylic bond represented by the following formula:

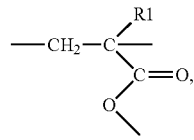

wherein in the formula, R1 represents hydrogen or a methyl group, and
the third atom groups are bonded to an ester bond of the (meth)acrylic bond directly.

7. A roll, comprising:
a resin layer containing a first atom group having a plurality of sulfur atoms, a plurality of second atom groups having a carbon chain that has a plurality of carbon atoms arranged in a line and has an end bonded to any one of the plurality of sulfur atoms, and a plurality of third atom groups each of which has a urethane bond and is bonded to any one of the plurality of second atom groups; and
a cylindrical foamed resin having an outer surface covered with the resin layer,
wherein the static friction coefficient of the roll is 1.5 or more, and
the second atom groups contain a (meth)acrylic bond represented by the following formula:

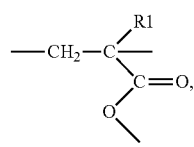

wherein in the formula, R1 represents hydrogen or a methyl group, and
the third atom groups are bonded to an ester bond of the (meth)acrylic bond directly.

8. A method for manufacturing a roll, comprising:
reacting a monomer having a (meth)acrylic acid group and a hydroxyl group, a polyol and an isocyanate having a plurality of isocyanate groups to generate a polymer having an unsaturated bond and a urethane bond,
applying a raw material to the outer surface of a cylindrical foam, the raw material containing the polymer having an unsaturated bond and a urethane bond, a polyfunctional thiol having a plurality of thiol groups, and a photopolymerization initiator; and
irradiating the applied raw material with an ultraviolet ray to cure the raw material to form a resin layer,
wherein the resin layer contains a first atom group having a plurality of sulfur atoms from the polyfunctional thiol, a plurality of second atom groups from the monomer having a (meth)acrylic acid group and a hydroxyl group, the second atom groups having a carbon chain that has a plurality of carbon atoms arranged in a line and has an end bonded to any one of the plurality of sulfur atoms, and a plurality of third atom groups from the polyol and the isocyanate having a plurality of isocyanate groups, each of the third atom groups having a urethane bond and being bonded to any one of the plurality of second atom groups;
the second atom groups contain a (meth)acrylic bond represented by the following formula:

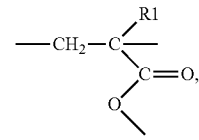

wherein in the formula, R1 represents hydrogen or a methyl group, and
the third atom groups are bonded to an ester bond of the (meth)acrylic bond directly.

9. The method for manufacturing a roll according to claim 8, wherein
the foam is a urethane foam in a state where a porous cell structure is exposed on the outer surface, and
a viscosity of the raw material is adjusted so as to penetrate into the porous cell structure and form an impregnation layer by the applying step.

10. The method for manufacturing a roll according to claim 8, wherein the roll is a retard roll used for a conveying unit of an image forming apparatus for forming an image on a print medium.

* * * * *